Patented Sept. 5, 1922.

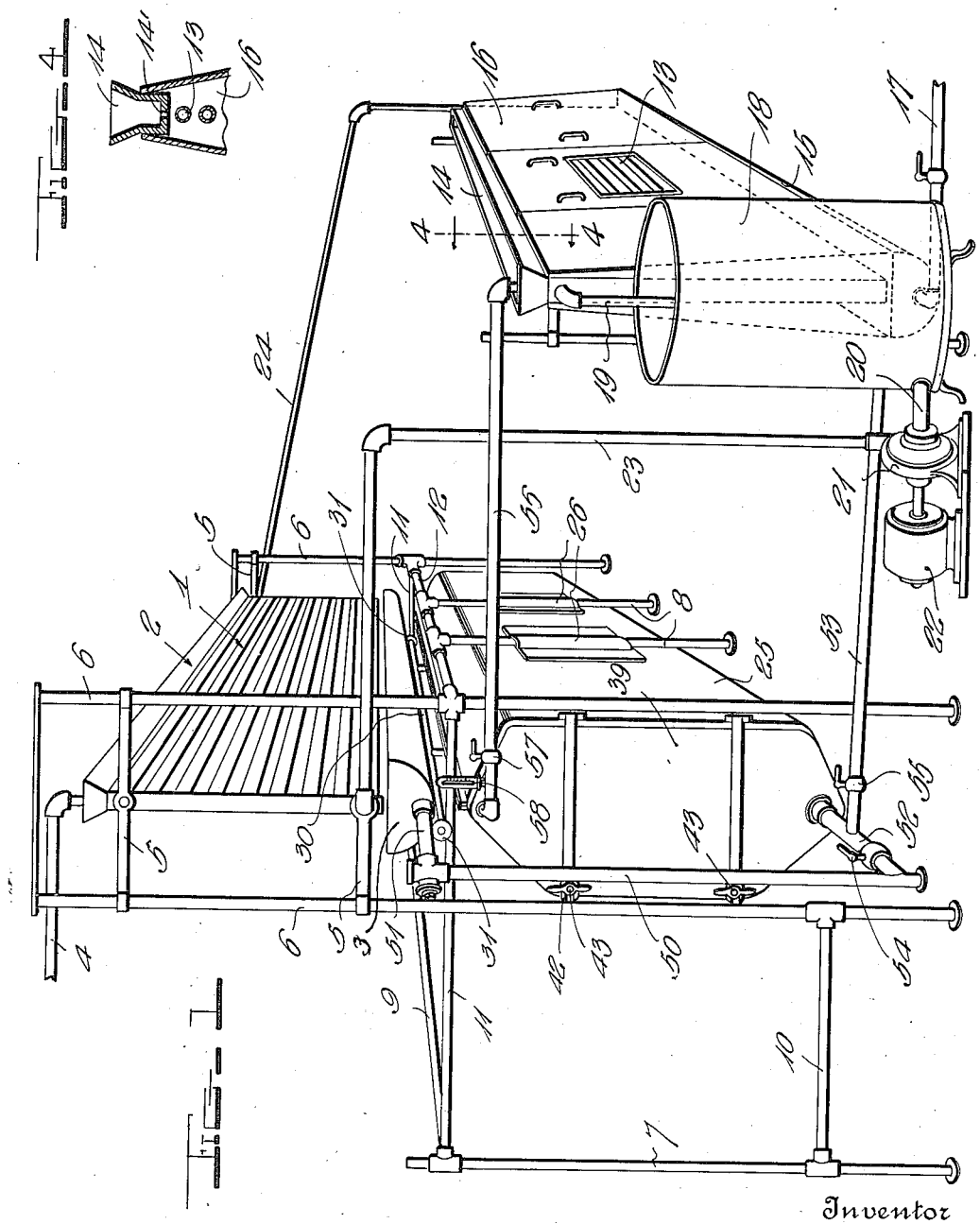

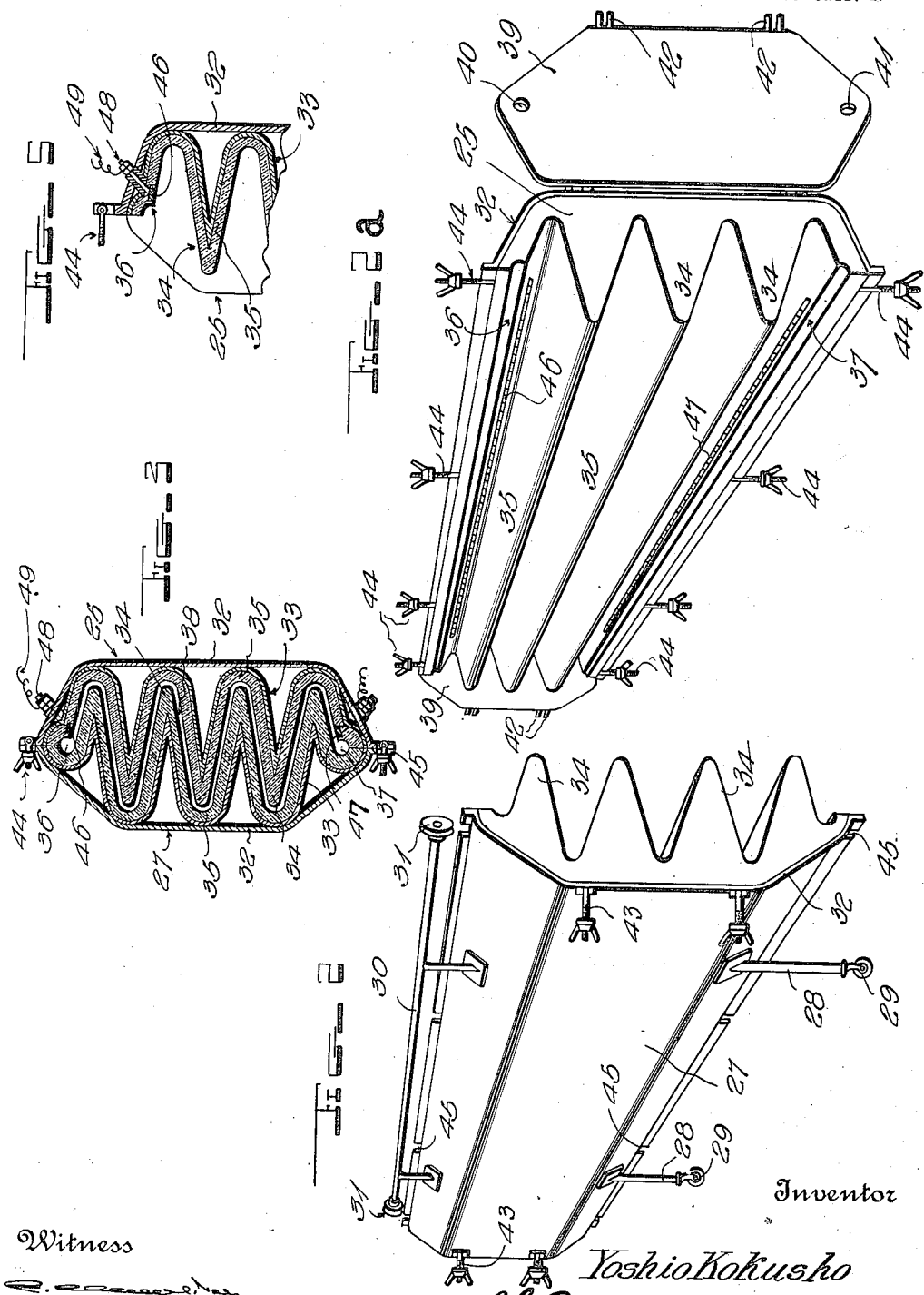

1,428,379

UNITED STATES PATENT OFFICE.

YOSHIO KOKUSHO, OF PHILADELPHIA, PENNSYLVANIA.

PASTEURIZER.

Application filed October 14, 1920. Serial No. 416,791.

*To all whom it may concern:*

Be it known that I, YOSHIO KOKUSHO, a subject of the Emperor of Japan, residing at Philadelphia, in the county of Philadelphia and State of Pennsylvania, have invented certain new and useful Improvements in Pasteurizers; and I do declare the following to be a full, clear, and exact description of the invention, such as will enable others skilled in the art to which it appertains to make and use the same.

This invention relates to an improved pasteurizer, and one object of the invention is to provide a pasteurizer in which cool milk may be delivered to a preheater heated by means of hot water, the milk being then delivered to a heater and the water which has been cooled in the preheater by heating the milk delivered to a precooler through which the hot milk from the milk heater passes, passage of the hot milk through the precooler causing the cooling water therein to be heated and this hot water then delivered to a reservoir tank from which the hot water will be delivered to the preheater.

Another object of the invention is to so construct this device that it is only necessary to heat the water of the reservoir tank by an outside means when first starting the pasteurizer in operation, the water being cooled when the heat thereof is taken up by the milk in the preheater and the water being again heated by taking up the heat from the milk delivered to the precooler from the milk heater.

Another object of the invention is to provide an improved type of milk heater so constructed that separable side sections are provided which when brought together will provide a milk channel through which the milk passes, electrodes being positioned in and insulated from the walls of the heater so that the current of electricity will pass through the milk in completing a circuit and thus cause the milk to be heated as it passes through the heater.

Another object of the invention is to so construct this heater that the separable sections thereof may be easily and quickly taken apart or put together thus permitting the heater to be easily and quickly cleaned.

Another object of the invention is to so construct this pasteurizer that one section of the heater may be a relatively stationary section and the second a relatively movable section mounted upon tracks of a frame and thus permitted of being easily moved into and out of operative engagement with the relatively stationary section.

Another object of the invention is to so construct this pasteurizer that the preheater may be mounted in a frame above the milk heater, and the precooler and water reservoir mounted adjacent the preheater and milk heater thus providing a compact construction.

Another object of the invention is to so construct this device that it will be free from noise and require a small amount of attention when it is in operation.

This invention is illustrated in the accompanying drawings, wherein:

Figure 1 is a perspective view of the improved pasteurizer.

Figure 2 is a perspective view of the relatively movable section of the milk heater.

Figure 2ᵃ is a perspective view of the relatively stationary section of the milk heater.

Figure 3 is a vertical transverse sectional view of the milk heater.

Figure 4 is a fragmentary sectional view taken along the line 4—4 of Fig. 1.

Figure 5 is an enlarged fragmentary sectional view through the upper portion of the relatively stationary section of the milk heater.

This improved pasteurizer is provided with a preheater 1 which is of a conventional type of construction and includes an upper trough 2 and a lower trough 3, the milk to be preheated flowing into the trough 2 through a pipe 4 and from the trough 2 passing down over the water-heated pipe of the preheater and dropping into the trough 3. This preheater is connected with the cross bars 5 carried by the standards 6 of a supporting frame and therefore the preheater will be supported in an elevated position. The frame which supports this preheater is provided with additional standards 7 and 8 and the standards 7 are connected with each other by a connecting bar 9 and with the standards 6 by connecting bars 10 and 11. The standards 8 are connected with a longitudinally extending bar 12 which is connected with the standards 6 at the points where the standards are engaged by the bars or rails 11 and therefore a very strong and durable frame will be provided which will be easy to erect.

A precooler 13 is positioned upon the ground adjacent the frame carrying the preheater and this is also of a conventional construction and provided with an upper trough 14 for receiving heated milk and a lower trough 15 for receiving the cooled milk. This trough 14 is positioned above the pipes of the precooler and is of similar construction to the trough 2, a plurality of openings 14' being provided in the bottom of the trough so that the milk will pass from the trough in small streams which will pass down upon the pipes of the precooler. A casing 16 is provided about the pipes of the precooler so that air will be excluded and thus milk which is passing through the precooler is protected from exposure to the atmosphere. A draw-off pipe 17 is provided for the trough 15 so that the cool milk from the trough 15 may be led to a suitable point of deposit, such for instance as a refrigerator or bottling machine. In order to supply heating and cooling water for the preheater and precooler, there has been provided a warm water reservoir 18 which is positioned adjacent the precooler so that warm water from the precooler will pass through the pipe 19 and into the reservoir. This hot water passes out of the reservoir through the pipe 20 and into the centrifugal pump 21 which is operated by means of a suitable electric motor 22 and forces the hot water through the pipe line 23 into the lower portion of the preheater. The water in passing through the preheater gives off its heat to the milk which is to be preheated and passes out of the preheater into the pipe 24 in the form of cool water. This cool water enters the precooler at the lower end and in passing up through the pipes of the precooler, takes up the heat from the milk to be cooled and passes out through the pipe 19 in the form of hot water. It will thus be seen that as the water circulates, it is first cooled in preheating the milk and is then heated in precooling the milk. Therefore, it is only necessary to heat the water in the reservoir by external means when first putting the machine into operation.

A milk heater is positioned in the frame beneath the preheater and is constructed as shown in the detailed views of this milk heater. This milk heater is provided with a relatively stationary section 25 which is connected with the standards 8 by the attaching brackets 26 as shown in Fig. 1. The relatively movable section 27 has a construction very similar to the stationary section but is provided with supporting legs 28 having castors 29 and is further provided with a longitudinally extending bar 30 having rollers 31 mounted thereon and engaging the rails 11. It will thus be seen that the movable section can be easily rolled longitudinally of the rails 11 and thus moved into and out of operative engagement with the stationary section. The stationary section and the movable section will be constructed as shown in Figs. 2 and 3 and from an inspection of these figures, it will be seen that each of these sections is provided with an outer wall 32 and an inner wall 33, the inner wall being folded longitudinally thus providing arms 34 which extend in overlapping relation. A covering or coating 35 formed of porcelain, glass or any other suitable insulating material which will be clean and sanitary, is provided for each of the inner walls and the upper and lower end portions of these inner walls and coverings are curved as shown in Fig. 3 so that when the two sections of the heater are connected, there will be provided upper and lower pockets 36 and 37 connected by a milk passage or channel 38 having a zig-zag path. Heads 39 are hingedly connected with the stationary section and provided with openings 40 and 41 for registering with the pockets 36 and 37 when the heads are swung to a closed position and these heads are provided with spaced fingers 42 for engagement by securing bolts 43 carried by the movable section. Similar bolts 44 are provided upon the stationary section for passing through notches 45 formed in the upper and lower flanges of the movable section and it will thus be seen that when the movable section is in engagement with the stationary section and the bolts 43 and 44 swung to the operative position and tightened, the movable section will be securely but releasably connected with the stationary section. The jaws or heads and the contacting upper and lower portions of the two sections will, of course, be provided with a water-tight fit to prevent leakage of milk from the heater, suitable packing being provided if necessary. From an inspection of Fig. 3, it will be seen that an electrode 46 is provided adjacent the upper end of the milk channel and a second electrode 47 is provided adjacent the lower end of this milk channel. Each of these electrodes is in the form of a bar as shown in Fig. 2ᵃ which is imbedded in the insulating coating 35, and as shown in Fig. 5 is provided with a stem 48 which extends outwardly through the walls 33 and 32 for connection with a wire 49 and it will thus be seen that the electrodes will be in spaced relation and insulated from each other but will be positioned in the milk channel so that when the milk channel is filled with milk the space between the two electrodes will be bridged by the milk and thus electric current permitted to pass through the milk from one electrode to the second. This will cause the milk to be heated. A pipe 50 is positioned vertically, as shown in Fig. 1 and has at its upper end a branch 51 which is connected with the trough 3 of the preheater and at its lower end a valve controlled branch 52 which extends through the lower opening 41 for communicating with the lower milk pocket 37. A drain pipe 53 extends from the branch 52 and since the branch 52 is provided with a valve 54 and the drain pipe with a valve 55, the flow of milk through these pipes can be easily controlled. A pipe 56 which communicates with the trough 14 and is provided with a control-valve 57 and thermometer 58 extends through the upper opening 40 and communicates with the upper milk pocket 36. Therefore the milk from the preheater may pass into the pocket 37 and after passing upwardly through the milk channel to the pocket 36, may pass from the heater through the pipe 56 and into the trough 14 of the precooler.

When this device is in use, heated water will be placed in the reservoir 18 or water may be placed in this reservoir and a suitable heater provided beneath the reservoir to initially heat the water. The hot water is pumped through the pipe 23 to the preheater and in passing upwardly through this heater, the heat of the water will be taken up by the milk which is flowing over the pipes of the preheater. This milk flows down into the trough and from the trough 3 through the pipe 50 and branch 52 into the milk heater. The valve 54 will of course be open and the valve 55 closed. The milk passes up through the channel 38 and when the circuit is closed between the electrodes, the milk will be heated by the heating action of the electric current. The valve 57 will be kept closed until the thermometer shows the milk to have reached the desired degree of heat. As soon as the milk has been heated to the point desired the valve 57 will be opened and the milk will flow through the pipe 56 into the trough 14 of the precooler. The cold water from the preheater passes upwardly through the pipes of the precooler and as the hot milk passes over the pipes of the precooler, from the trough 14, the heat will be taken up by the water in the pipes of the precooler. The cooled milk will pass out of the trough 15 of the precooler through the pipe 17 to the refrigerator or to any other suitable receptacle and the water which has become heated will pass out of the precooler through the pipe 19 back into the reservoir 18. It will thus be seen that when the device is in use, it is only necessary to initially heat the water of the reservoir. When it is desired to discontinue use of the pasteurizer and clean the same, the motor 22 will be stopped and the valve 54 closed and the valve 55 opened. The milk in the heater will then drain out through the pipe 53 into a suitable receptacle. The securing bolts 43 and 44 will be released thus releasing the relatively movable section of the heater from the relatively stationary section. This movable section can then be moved along the rails 11 and the two sections will be separated. Each of the sections can then be thoroughly cleaned and then put together again. Live steam can then be forced through the heater by connecting a steam pipe with the pipe 53 and as the live steam passes through the heater and out through the pipe 56, the heater will be thoroughly sterilized. Therefore, the heater can be easily and quickly cleaned and then put together and sterilized. When in use the pasteurizer is noiseless and further does not require any attention except to properly set the valves 54 and 57 to control the speed at which the milk passes through the heater. Proper adjustment of the valves will cause the milk to flow at a desired speed and therefore the milk will be heated a uniform amount.

I claim:

1. In a pasteurizer, a milk heater comprising separable side sections having their edge portions in contacting relation, wall members of insulating material carried by the side sections and having extensions extending in overlapping and spaced relation to provide a milk channel having an inlet at one end and an outlet at its opposite end, and electrodes extending through the insulating wall member, milk in the channel bridging the space between the electrodes and completing a circuit to heat the milk.

2. In a pasteurizer, a milk heater comprising a relatively stationary section and a relatively movable section each having an outer wall, an inner wall crimped longitudinally to provide arms, the arms of one section extending in overlapping relation to the second section and in spaced relation thereto and the edge portions of the section having contacting relation to provide a milk passage between the overlapping arms and having an inlet at one end and an outlet at the second end, and electrodes extending through the wall of one section and insulated therefrom and extending into the end portion of the milk passage.

3. In a pasteurizer, a milk heater comprising a body having separable side sections, each having an outer wall, an inner wall having spaced arms, a covering of insulating material for the inner wall, the arms of said sections extending in overlapping and spaced relation to provide a milk passage, and the upper and lower end portions of the inner walls and coverings being bent to provide enlarged pockets extending longitudinally of the body, the pocket at one end having communication with an inlet and the pocket at the second end having communication with an outlet, and electrodes extending through the walls and insulating covering whereby milk passing through the milk passage may bridge the space between the electrodes.

In testimony whereof I have hereunto set my hand.

YOSHIO KOKUSHO.